US007218437B2

(12) United States Patent
Selbrede

(10) Patent No.: US 7,218,437 B2
(45) Date of Patent: May 15, 2007

(54) FIELD SEQUENTIAL COLOR EFFICIENCY

(75) Inventor: Martin G. Selbrede, Austin, TX (US)

(73) Assignee: Uni-Pixel Displays, Inc., The Woodlands, TX (US)

( * ) Notice: Subject to any disclaimer, the term of this patent is extended or adjusted under 35 U.S.C. 154(b) by 0 days.

(21) Appl. No.: 11/363,624

(22) Filed: Feb. 28, 2006

(65) Prior Publication Data

US 2006/0146389 A1 Jul. 6, 2006

Related U.S. Application Data

(63) Continuation of application No. 10/513,631, filed as application No. PCT/US2003/014481 on May 6, 2003.

(60) Provisional application No. 60/380,098, filed on May 6, 2002.

(51) Int. Cl.
*G02F 1/01* (2006.01)

(52) U.S. Cl. ......................... 359/276; 345/88; 348/742

(58) Field of Classification Search ................ 359/276; 348/742; 345/88
See application file for complete search history.

(56) References Cited

U.S. PATENT DOCUMENTS

| | | | | |
|---|---|---|---|---|
| 5,122,791 | A * | 6/1992 | Gibbons et al. | ............ 345/102 |
| 5,748,335 | A | 5/1998 | Honma et al. | |
| 6,002,452 | A | 12/1999 | Morgan | |
| 6,285,491 | B1 | 9/2001 | Marshall et al. | |
| 6,307,663 | B1 | 10/2001 | Kowarz | |
| 6,340,963 | B1 | 1/2002 | Anno et al. | |
| 6,348,907 | B1 | 2/2002 | Wood | |
| 6,535,187 | B1 | 3/2003 | Wood | |

* cited by examiner

*Primary Examiner*—Hung Xuan Dang
*Assistant Examiner*—Joseph Martinez
(74) *Attorney, Agent, or Firm*—Fish & Richardson P.C.; Kelly Kordzik

(57) ABSTRACT

A method and system for generating colors efficiently. In one embodiment, a start signal for a primary color subcycle may be received. A primary light source used to drive the primary color may be activated if there is data in the primary color's buffer. The primary light source may be deactivated during the primary color subcycle if there is no data in the primary color's buffer. In another embodiment, a highest amplitude signal for one of a plurality of primary colors may be normalized. A drive light source intensity may be adjusted to a percentage of a maximum intensity where the percentage corresponds to a content of the normalized primary color in a frame. The amplitude of all but the normalized primary color may be adjusted proportionally. In another embodiment, a maximum intensity for a light source intensity may be set to a first value. A maximum pixel intensity for each of a plurality of pixels may be set to a second value. The maximum intensity for the light source intensity may be adjusted by the first value divided by the second value. An amplitude for each of the plurality of pixels may be adjusted by the second value divided by the first value.

7 Claims, 9 Drawing Sheets

Default Mode
Full Intensity Lamps

Efficiency Enhanced Mode
Identical video output, amplitudes adjusted. Dotted line shows full intensity level. Gap between dotted line and signal = energy savings

FIELD SEQUENTIAL COLOR EFFICIENCY

CROSS REFERENCE TO RELATED APPLICATIONS

The present application is a continuation application of pending U.S. patent application Ser. No. 10/513,631, which is assigned to the assignee of the present invention, which was filed on Nov. 5, 2004, which is a 371 National Phase of International Application No. PCT/US2003/014481 filed on May 6, 2003, which claims priority under 35 U.S.C. §119(e) to the following U.S. patent application Ser. No. 60/3 80,098 filed on May 6, 2002.

This application is related to the following commonly owned copending U.S. Patent Application:

Provisional Application Ser. No. 60/380,098, "Field Sequential Color Efficiency Enhancement", filed May 6, 2002, and claims the benefit of its earlier filing date under 35 U.S.C. 119(e).

TECHNICAL FIELD

The present invention relates to the field of field sequential color display systems, and more particularly to enhancing the primary drive lamp efficiency in a field sequential color display.

BACKGROUND INFORMATION

Field sequential color displays, such as the one disclosed in U.S. Pat. No. 5,319,491, which is hereby incorporated herein by reference in its entirety, may use either pulse width modulation of primary colors (also known as time-multiplexing) to create color mixtures on a display screen, or amplitude modulation of each primary color to create the same effect Bach of these approaches provides sequential cycling of the primary colors in the screen at a high enough frequency that an individual's attribute of persistence of vision integrates the resulting light energy into a seamless image.

Field sequential displays, such as the one disclosed in U.S. Pat. No. 5,319,491, feeds light to pixels of each primary color, e.g., red, green, blue, by activating and deactivating lamps, referred to herein as "primary lamps." The energy required to drive the primary lamps has been increasing in recent years in order to improve contrast ratios, viewing angles and visibility of the displays such as by having brighter primary lamps.

Therefore, there is a need in the art to drive primary lamps more efficiently in field sequential color displays.

SUMMARY

The problems outlined above may at least in part be solved in some embodiments of the present invention by mitigating the inherent energy inefficiencies inherent with continuous and/or phased illumination requirements as described below.

In one embodiment, a method for generating colors efficiently using pulse width modulation may comprise the step of waiting for a start signal for a primary color subcycle. The method may further comprise the step of receiving the start signal. The method may further comprise activating a primary light source used to drive the primary color during the primary color subcycle if there is data in the primary color's buffer. The method may further comprise continuing to activate the primary light source during the primary color subcycle until there is no data in the primary color's buffer. The method may further comprise deactivating the primary light source during the primary color subcycle if there is no data in the primary color's buffer.

In another embodiment of the present invention, a method for generating colors efficiently using amplitude modulation may comprise the step of normalizing a highest amplitude signal for one of a plurality of primary colors. The method may further comprise adjusting a drive light source intensity to a percentage of a maximum intensity where the percentage corresponds to a content of the normalized primary color in a frame. The method may further comprise adjusting an amplitude of all but the normalized primary color proportionally.

In another embodiment of the present invention, a method for generating colors efficiently using amplitude module may comprise the step of setting a maximum intensity for a light source intensity to a first value. The method may further comprise setting a maximum pixel intensity for each of the plurality of pixels to a second value. The method may further comprise adjusting the maximum intensity for the light source intensity by the first value divided by the second value. The method may further comprise adjusting an amplitude for each of the plurality of pixels by the second value divided by the first value.

The foregoing has outlined rather broadly the features and technical advantages of one or more embodiments of the present invention in order that the detailed description of the invention that follows may be better understood Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
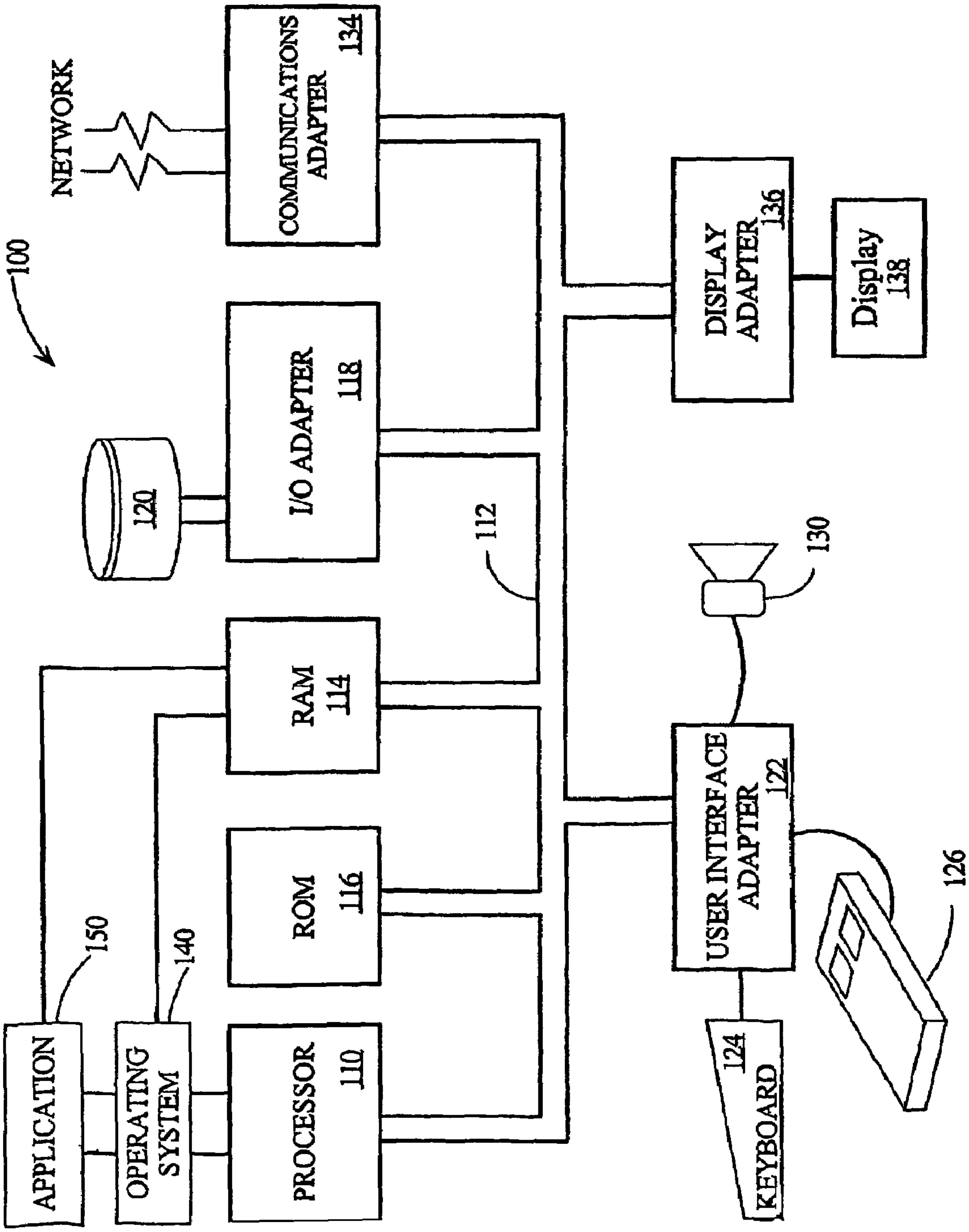
FIG. 1 illustrates an embodiment of a data processing system configured in accordance with the present invention.

The present invention comprises a system and method for creating colors on a display efficiently. In one embodiment of the present invention, a start signal for a primary color subcycle may be received. A primary light source (which may be generalized to an illumination device of any design) used to drive the primary color may be activated during the primary color subcycle if there is data in the primary color's buffer. The primary light source may be continued to be activated during the primary color subcycle until there is no data in the primary color's buffer. The primary light source may be deactivated during the primary color subcycle if there is no data in the primary color's buffer. In another embodiment of the present invention, a highest amplitude signal for one of a plurality of primary colors may be normalized. A drive light source intensity may be adjusted to a percentage of a maximum intensity where the percentage corresponds to a content of the normalized primary color in a frame. The amplitude of all but the normalized primary color may be adjusted proportionally. In another embodiment of the present invention, a maximum intensity for a light source intensity may be set to a first value. A maximum pixel intensity for each of a plurality of pixels may be set to a second value. The maximum intensity for the light source intensity may be adjusted by the first value divided by the second value. An amplitude for each of the plurality of pixels may be adjusted by the second value divided by the first value.

Although the present invention is described with reference to a computer system, it is noted that the principles of the present invention may be applied to any system that has a field sequential decoder such as a television, a telephone, a projection system or a LCD display. It is further noted that a person of ordinary skill in the art would be capable of applying the principles of the present invention as discussed herein to such systems. It is further noted that embodiments applying the principles of the present invention to such systems would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

As stated in the Background Information section, field sequential displays, such as the one disclosed in U.S. Pat. No. 5,319,491, feeds light to pixels of each primary color, e.g., red, green, blue, by activating and deactivating primary lamps. The energy required to drive the primary lamps has been increasing in recent years in order to improve contrast ratios, viewing angles and visibility of the displays such as by having brighter primary lamps. Therefore, there is a need in the art to drive primary lamps more efficiently in field sequential color displays as addressed by the present invention discussed below.

Referring to FIG. 1, FIG. 1 illustrates a typical hardware configuration of data processing system 100 which is representative of a hardware environment for practicing the present invention. Data processing system 100 may have a processing unit 110 coupled to various other components by system bus 112. An operating system 140, may run on processor 110 and provide control and coordinate the functions of the various components of FIG. 1. An application 150 in accordance with the principles of the present invention may run in conjunction with operating system 140 and provide calls to operating system 140 where the calls implement the various functions or services to be performed by application 150. Read-Only Memory (ROM) 116 may be coupled to system bus 112 and include a Basic Input/Output System ("BIOS") that controls certain basic functions of data processing system 100. Random access memory (RAM) 114 and Disk adapter 118 may also be coupled to system bus 112. It should be noted that software components including operating system 140 and application 150 may be loaded into RAM 114 which may be data processing system's 100 main memory for execution. Disk adapter 118 may be an integrated drive electronics ("IDE") adapter that communicates with a disk unit 120, e.g., disk drive.

Referring to FIG. 1, data processing system 100 may further comprise a communications adapter 134 coupled to bus 112. I/O devices may also be connected to system bus 112 via a user interface adapter 122 and a display adapter 136. Keyboard 124, mouse 126 and speaker 130 may all be interconnected to bus 112 through user interface adapter 122. Event data may be inputted to data processing system 100 through any of these devices. A display 138, as described in further detail in conjunction with FIG. 2, may be connected to system bus 112 by display adapter 136. In this manner, a user is capable of inputting to data processing system 100 through keyboard 124 or mouse 126 and receiving output from data processing system 100 via display 138. It is noted that data processing system 100 is illustrative of a field sequential color display system and that the principles of the present invention, as discussed herein, may be applied to other systems, e.g., televisions, telephones, projection systems, LCD displays, that has a field sequential decoder.

Figure 2:
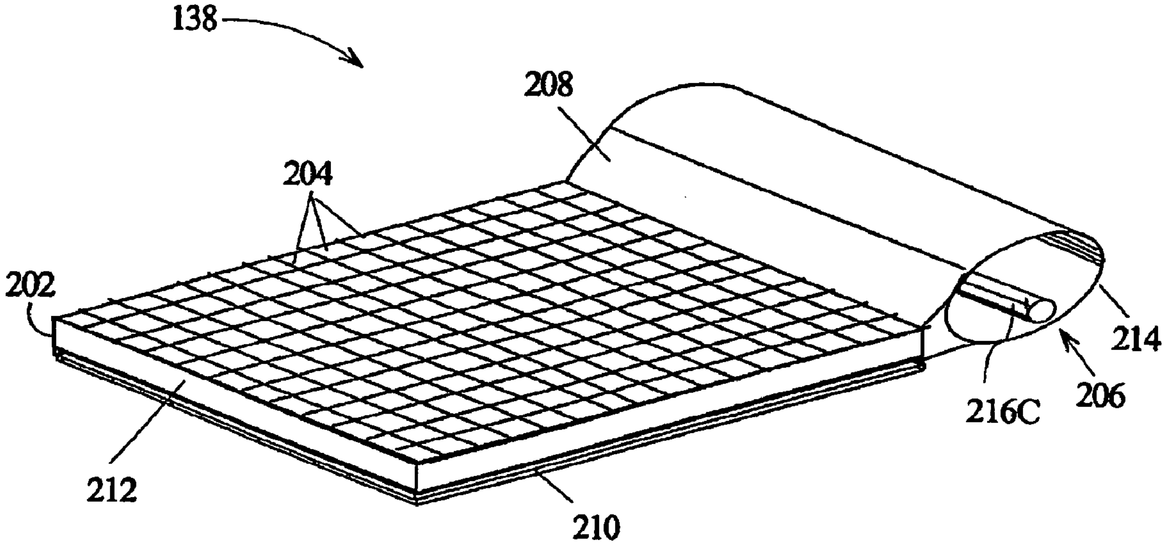
FIG. 2 is a perspective view of an optical display of the present invention.

Referring to FIG. 2, FIG. 2 illustrates an embodiment of the present invention of an optical display 138. Optical display 138 may comprise a light guidance substrate 202 which further comprises a flat-panel, n×m Matrix of optical shutters (also known as pixels, i.e., picture elements) 204 and a light source 206 which is capable of selectively providing white, red, green, blue, monochrome, and infrared light to the matrix 204. The light source 206 is connected to the matrix 204 by means of an opaque throat 208. Behind the light guidance substrate 202 and in parallel, spaced-apart relationship with it is an opaque backing layer 210. The edges of the light guidance substrate 202 are silvered, as indicated, for example, at 212.

The light source 206 comprises an elliptical reflector 214 which extends the length of the side of the light guidance substrate 202 on which it is placed. In one embodiment, reflector 214 includes three tubular lamps 216*a*, 216*b*, and 216*c* (not entirely shown in FIG. 2) disposed in a serial, coaxial manner. The lamps 216*a*, 216*b* and 216*c* provide, respectively, red, green, and blue light The longitudinal axis of the lamps 216*a*, 216*b* and 216*c* is offset from the major axis of the reflector 214 in order to reduce optical losses due to the presence of on-axis light rays that fail to reflect off the top surface of the light guidance substrate. In other words, the lamps are situated to minimize the presence of light which is unusable for shuttering/display purposes. In another embodiment, the three tubular lamps 216*a–c* may be replaced with a series of colored Light Emitting Diodes (LED's) or cold cathode fluorescent lighting.

The light source 206 further comprises the opaque throat aperture 208 which is rigidly disposed on one edge of the light guidance substrate 202. The aperture 208 in turn rigidly supports the reflector 214 and its associated lamps 216*a*, 216*b* and 216*c*. The aperture 208 is proportioned to admit and allow throughput of light from the light source 206 which enters at angles such that the sine of any given angle is less than the quotient of the throat height divided by the throat depth.

Figure 3:
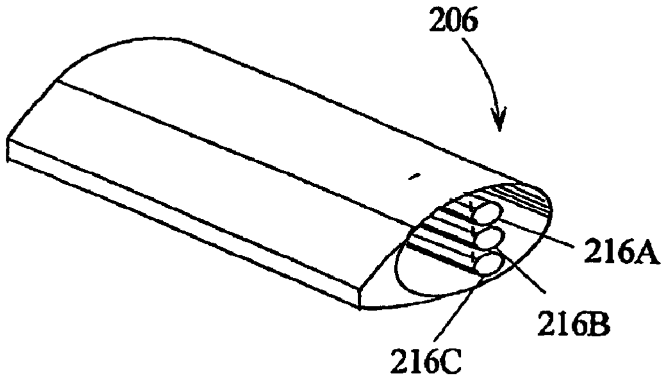
FIG. 3 is a perspective view of an alternative light source for the display as shown in FIG. 2.

In FIG. 3, there is shown an alternative light source which comprises an opaque throat aperture 208 as discussed above which is rigidly connected to an elliptical reflector 214 also as discussed above. However, within the reflector 214 are disposed a red lamp 216*a*, a green lamp 216*b*, and a blue lamp 216*c* in a vertical stack within the reflector 214. Lamps 216*a*, 216*b* and 216*c* may collectively or individually be referred to as lamps 216 or lamp 216, respectively. It is noted that lamp 216 may be referred to herein as a "primary lamp" or a "drive lamp."

Should infrared light be desired, the colored lamps may either be replaced with an infrared lamp, or an infrared lamp may be disposed next to the colored lamps within the reflector 214, or an infrared lamp may be disposed within its own reflector (not shown) on another edge of the light guidance substrate 202.

It is noted that FIGS. 2–3 are illustrative of an embodiment of display 138. It is noted that the principles of the present invention may be applied to any type of display that uses field sequential colors. It is further noted that a person of ordinary skill in the art would be capable of applying the principles of the present invention as discussed herein to such displays. It is further noted that embodiments applying the principles of the present invention to such displays would fall within the scope of the present invention.

The present invention may produce efficiency gains by addressing the matter of wasted light energy in the default light cycle system. When a drive lamp is no longer needed, it may be turned off. The turn-off signal sent to the primary drive lamp may be latched to the trailing edge of the last pixel that has program content for that primary. Accordingly, ultimate efficiency may be a function of program content.

Figure 4:
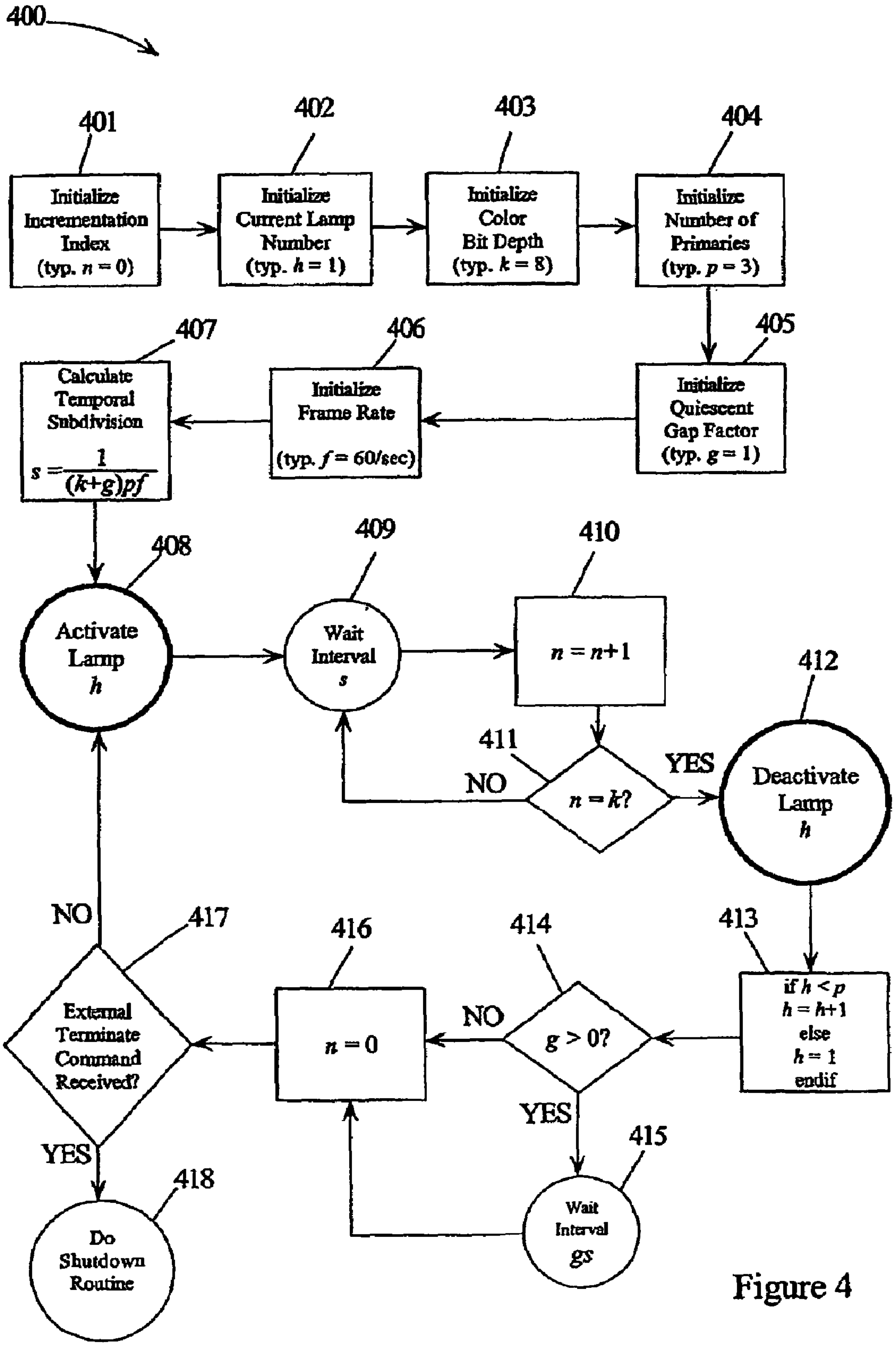
FIG. 4 is a flowchart of a drive lamp algorithm in accordance with an embodiment of the present invention.

A drive lamp algorithm for a pulse-width modulated field sequential color display system prior to the application of the efficiency algorithm of the present invention is disclosed in FIG. 4. Referring to FIG. 4, the drive lamp algorithm 400 used in a field sequential color display, such as display 138 (see FIG. 1), initializes an incrementation index ("n"), e.g., n=0, in step 401.

In step 402, a particular primary lamp ("h") is initialized For example, a primary lamp ("h") corresponding to the value of "1", e.g., blue primary lamp, may be initialized. In step 403, the color bit depth is initialized. The color bit depth may refer to the number of hues or shades of color that may be displayed, e.g., $2^k$ colors may be displayed where k typically equals 8. In step 404, the number of primary colors ("p"), e.g., p=3 for red, green and blue, is initialized. In step 405, the quiescent gap factor ("g"), referring to the duration between activating and deactivating a primary lamp, is initialized, e.g., g=1. In step 406, the frame rate ("f"), referring to the duration of time a flame of an image is displayed, is initialized. For example, the frame rate (f) may typically be equal to 1/60 seconds.

In step 407, the temporal subdivision is calculated using the following equation:

$$s=1/((k+g)*p*f) \quad \text{(EQ1)}$$

where s is equal to the temporal subdivision, referring to the smallest discretely addressable duration of time within each frame; where k is equal to the bit depth; where g is equal to the gap factor, where p is equal to the number of primary colors and where f is equal to the frame rate.

In step 408, the primary lamp initialized in step 402 is activated. In step 409, a wait interval, equal to the temporal subdivision, is implemented. In step 410, the index is incremented by the value of one, e.g., n=n+1. In step 411, a determination is made as to whether the index (n) is equal to the bit color depth (k).

If the index is not equal to the bit color depth, then a wait interval, equal to the temporal subdivision, is implemented in step 409.

If the index is equal to the bit color depth, then, in step 412, the lamp initialized in step 402 is deactivated. In step 413, if the value of "h" (referring to a particular primary lamp) is less than "p" (referring to the number of primary colors), then the value of "h" is incremented. Otherwise, "h" is set to equal the value of "1."

In step 414, a determination is made as to whether the gap factor (g) is greater than zero. If the gap factor is greater than zero, then, in step 415, a wait interval, equal to the temporal subdivision times the gap factor, is implemented. Upon implementing the wait interval of step 415, the index (n) is set to zero in step 416.

If the gap factor (g) is not greater than zero, then the index (n) is set to zero in step 416.

In step 417, a determination is made as to whether an external command to terminate drive lamp algorithm 400 was received. If an external command to terminate drive lamp algorithm 400 was received, then the routine is shutdown in step 418.

Otherwise, the lamp corresponding to the value of "h" as established in step 413 is activated in step 408.

Figure 5:
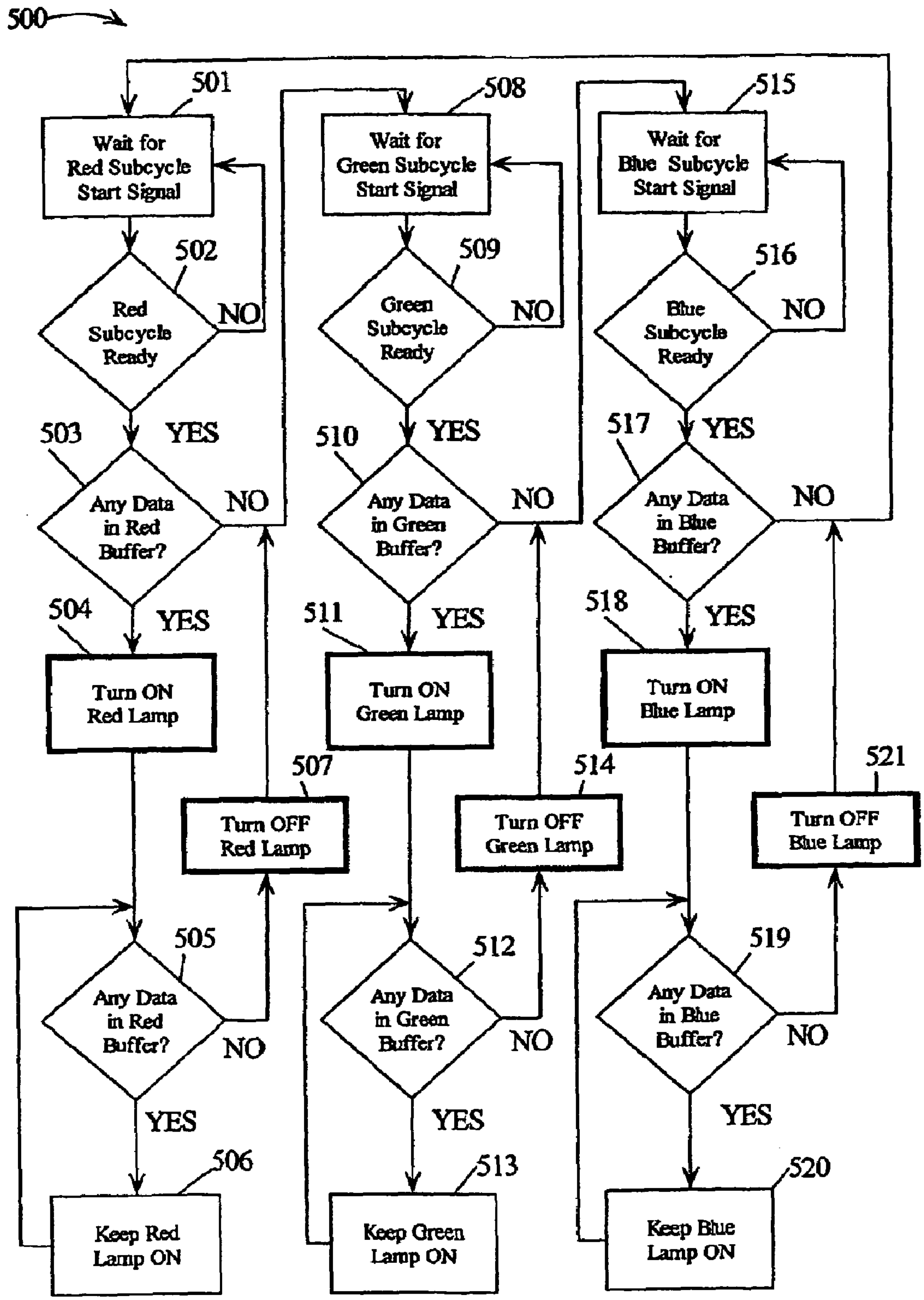
FIG. 5 is a flowchart of a method for generating colors efficiently using pulse width modulation in accordance with an embodiment of the present invention.

The efficiency gains using the efficiency algorithm of the present invention in a field sequential color display system using drive lamp algorithm 400 is described below in conjunction with FIG. 5. FIG. 5 is a flowchart of a method 500 for generating colors efficiently using pulse width modulation in accordance with an embodiment of the present invention.

Referring to FIG. 5, efficiency algorithm 500 may include a step of waiting for a red subcycle start signal in step 501. In step 502, a determination is made as to whether the red subcycle is ready. If the red subcycle is not ready, then algorithm 500 waits to receive the red subcycle start signal in step 501. If the red subcycle is ready, then, in step 503, a determination is made as to whether there is any data in the red buffer.

If there is data in the red buffer, then the primary lamp for the red primary color is activated in step 504. In step 505, a determination is made as to whether there is any data in the red buffer. If there is data in the red buffer, then, in step 506, the red primary lamp stays activated. A determination is then made in step 505 as to whether there is any data in the red buffer.

If, however, there is no data in the red buffer, then, in step 507, the red primary lamp is deactivated. The red primary lamp may be deactivated during the red subcycle thereby saving energy. In step 508, algorithm 500 waits to receive a green subcycle start signal.

As stated above, a determination is made in step 503, as to whether there is any data in the red buffer. If there is no data in the red buffer, then, in step 508, algorithm 500 waits to receive a green subcycle start signal. By not activating the red primary lamp since there is no data in the red buffer, energy is saved.

Referring to step 508, a determination is made in step 509 as to whether the green subcycle is ready. If the green subcycle is not ready, then algorithm 500 waits to receive the green subcycle start signal in step 508. If the green subcycle is ready, then, in step 510, a determination is made as to whether there is any data in the green buffer.

If there is data in the green buffer, then the primary lamp for the green primary color is activated in step 511. In step 512, a determination is made as to whether there is any data in the green buffer. If there is data in the green buffer, then, in step 513, the green primary lamp stays activated. A determination is then made in step 513 as to whether there is any data in the green buffer.

If, however, there is no data in the green buffer, then, in step 514, the green primary lamp is deactivated. The green primary lamp may be deactivated during the green subcycle thereby saving energy. In step 515, algorithm 500 waits to receive a blue subcycle start signal.

As stated above, a determination is made in step 510, as to whether there is any data in the green buffer. If there is no data in the blue buffer, then, in step 515, algorithm 500 waits to receive a blue subcycle start signal. By not activating the green primary lamp since there is no data in the green buffer, energy is saved.

Referring to step 515, a determination is made in step 516 as to whether the blue subcycle is ready. If the blue subcycle is not ready, then algorithm 500 waits to receive the blue subcycle start signal in step 515. If the blue subcycle is ready, then, in step 517, a determination is made as to whether there is any data in the blue buffer.

If there is data in the blue buffer, then the primary lamp for the blue primary color is activated in step 518. In step 519, a determination is made as to whether there is any data in the blue buffer. If there is data in the blue buffer, then, in step 520, the blue primary lamp stays activated. A determination is then made in step 519 as to whether there is any data in the blue buffer.

If, however, there is no data in the blue buffer, then, in step 521, the blue primary lamp is deactivated. The blue primary lamp may be deactivated during the blue subcycle thereby saving energy. In step 501, algorithm 500 waits to receive a red subcycle start signal.

As stated above, a determination is made in step 517, as to whether there is any data in the blue buffer. If there is no data in the blue buffer, then, in step 501, algorithm 500 waits to receive a red subcycle start signal. By not activating the blue primary lamp since there is no data in the blue buffer, energy is saved.

It is noted that method 500 may include other and/or additional steps that, for clarity, are not depicted. It is further noted that method 500 may be executed in a different order presented and that the order presented in the discussion of FIG. 5 is illustrative. It is further noted that certain steps in method 500 may be executed in a substantially simultaneous manner.

It is further noted that the field sequential color display system is extensible to more than three primary colors. Drive lamp algorithm 400 (FIG. 4) contains some refinements related to how finely divided the pulse modulation is set Efficiency algorithm 500 (FIG. 5) uses the natural buffer/cache states of the pulse modulation control for the screen's pixels to shut down unneeded primaries and prevent wasted energy from being expended which may result in lengthening the life span of batteries in portable displays, e.g., Personal Digital Assistant (PDA).

Figure 6A:
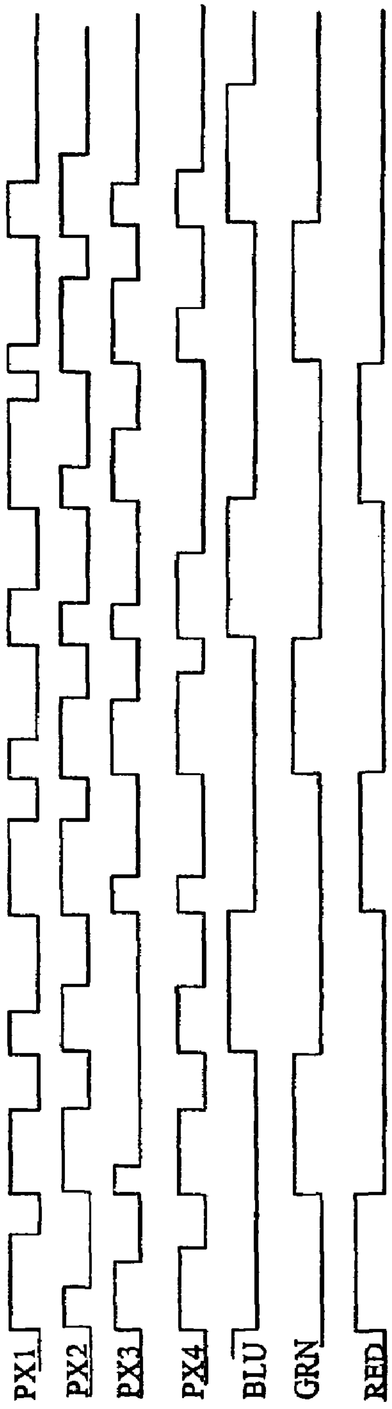
Figure 6A (Prior Art)
FIG. 6A illustrates a timing diagram depicting the signal pulse widths for four pixels and the colors blue, green and red in the field sequential color display system using pulse-width modulation and using the trailing edge to determine color intensities.
Figure 6B:
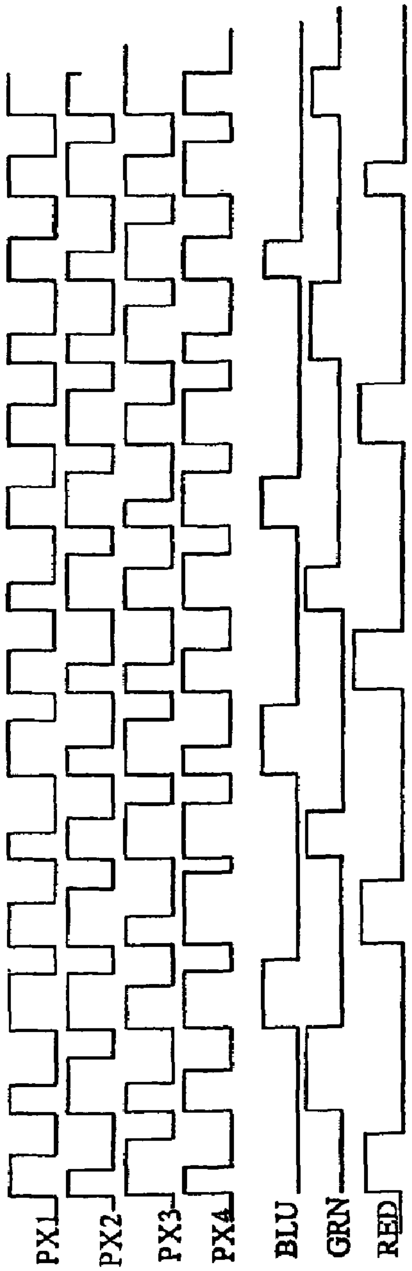
FIG. 6B illustrates a timing diagram depicting the signal pulse widths for four pixels and the colors blue, green and red in the field sequential color display system using the method of FIG. 5 in accordance with an embodiment of the present invention as well as using the trailing edge to determine color intensities.

A comparison of FIG. 6A (default algorithm without efficiency algorithm applied) and FIG. 6B, in which the algorithm of FIG. 5 has been incorporated into the lamp driver circuitry, illustrate how the present invention reduces waste and improve display efficiency. FIG. 6A illustrates a timing diagram depicting the signal pulse widths for four pixels and the colors blue, green and red in field sequential color display system 100 (see FIG. 1) using pulse-width modulation as well as using the trailing edge to determine color intensities. FIG. 6B illustrates a timing diagram depicting the signal pulse widths for four pixels and the colors blue, green and red in field sequential color display system 100 (see FIG. 1) using the method of FIG. 5 in accordance with an embodiment of the present invention as well as using the trailing edge to determine color intensities.

Referring to FIGS. 6A and 6B, the lower three lines in FIGS. 6A and 6B delineate the respective power-on times for the Red, Green, Blue (RGB) drive lamps. For the pixel program content example provided, the overall energy used is less than half of that in the default configuration. FIG. 6B depicts the ideal lamp cycle for maximum efficiency, and this cycle may be achieved by using the efficiency algorithm of FIG. 5 to determine the correct turn-off signals for the main driver sequence initialized in FIG. 4. The level of complexity required to achieve this improvement in efficiency may be reduced since it polls system information already in hand and dictates a straightforward interaction between the respective drive lamps and the signals feeding the on-screen pixels. This constitutes the application of the present invention to pulse width modulated field sequential color display devices, whether they are monochromatic systems, RGB systems, or use additional lights (whether visible or non-visible) as part of the drive suite.

Figure 7A:
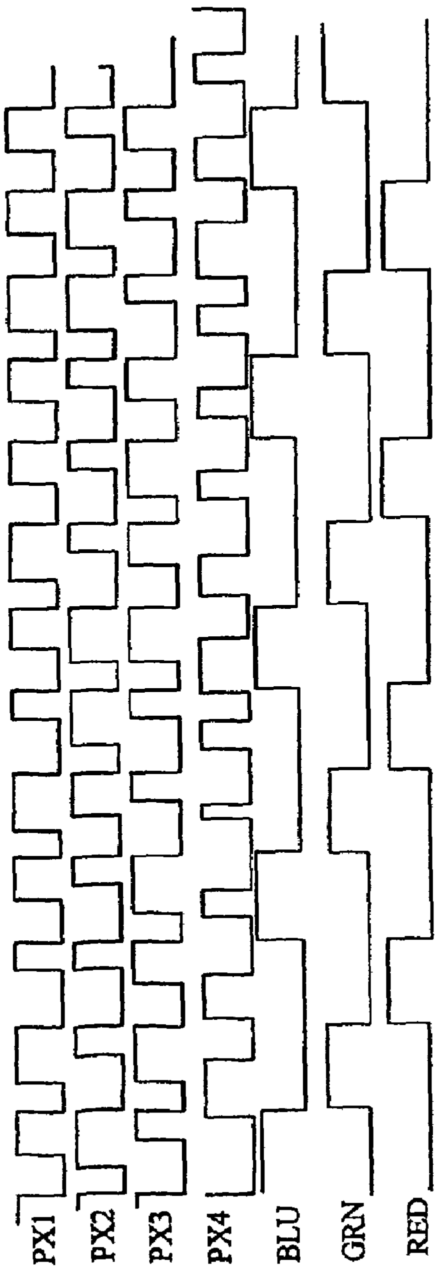
Figure 7A (Prior Art)
FIG. 7A illustrates a timing diagram depicting the signal pulse widths for four pixels and the colors blue, green and red in a field sequential color display system using pulse-width modulation and using the leading edge to determine color intensities.
Figure 7B:
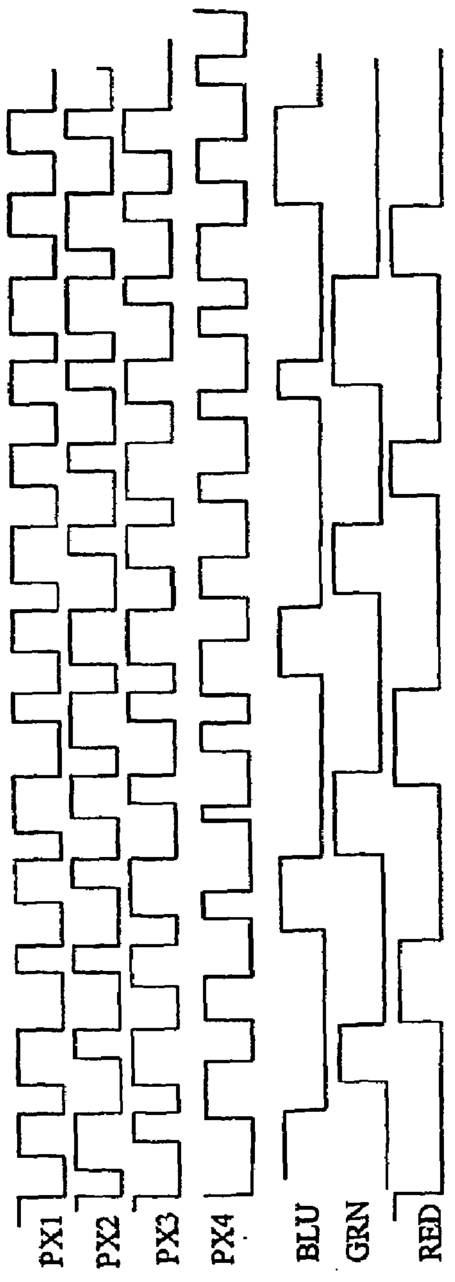
FIG. 7B illustrates a timing diagram depicting the signal pulse widths for four pixels and the colors blue, green and red in a field sequential color display system using the method of FIG. 5 in accordance with an embodiment of the present invention as well as using the leading edge to determine color intensities.

It is further noted that the principles of the present invention outlined above may apply to a field sequential color display using either the trailing edge or leading edge to determine color intensities since the triggering event latches image data resident in buffers. The specially triggered deactivation in the one addressing mode (trailing edge) disclosed above may be logically mirrored by a corresponding specially triggered activation in the other mode (leading edge), the inverse case of that disclosed. That is, the activation of a primary lamp used to drive a primary color during a primary color subcycle may be delayed until there is data in the primary color's buffer. If the field sequential color display uses leading edge to determine color intensities, FIGS. 6A and 6B may appear as FIGS. 7A and 7B, respectively. FIG. 7A illustrates a timing diagram depicting the signal pulse widths for four pixels and the colors blue, green and red in field sequential color display system 100 (see FIG. 1) using pulse-width modulation and using the leading edge to determine color intensities. FIG. 7B illustrates a timing diagram depicting the signal pulse widths for four pixels and the colors blue, green and red in field sequential color display system 100 (see FIG. 1) using the method of FIG. 5 in accordance with an embodiment of the present invention as well as using the leading edge to determine color intensities.

Figure 8A:
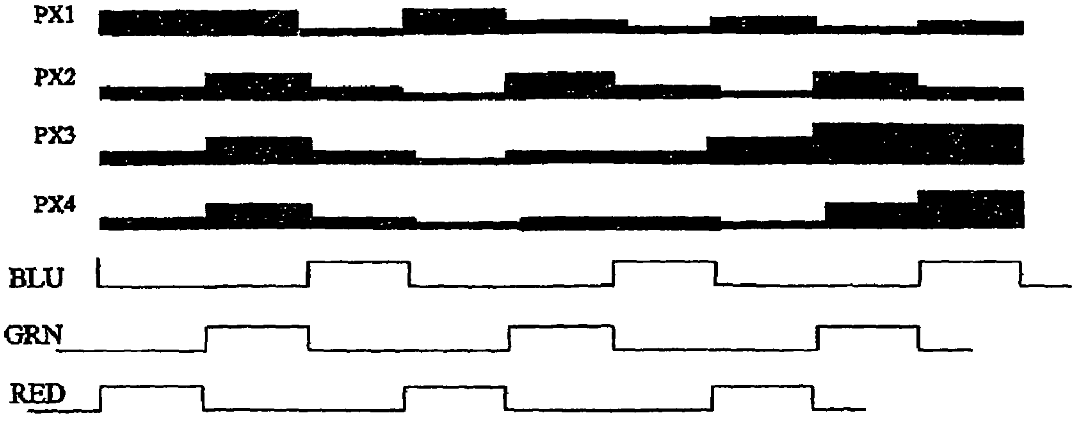
Figure 8A (Prior Art)
FIG. 8A illustrates a timing diagram depicting the signal pulse widths for four pixels and the colors blue, green and red in a field sequential color display system using amplitude modulation.
Figure 8B:
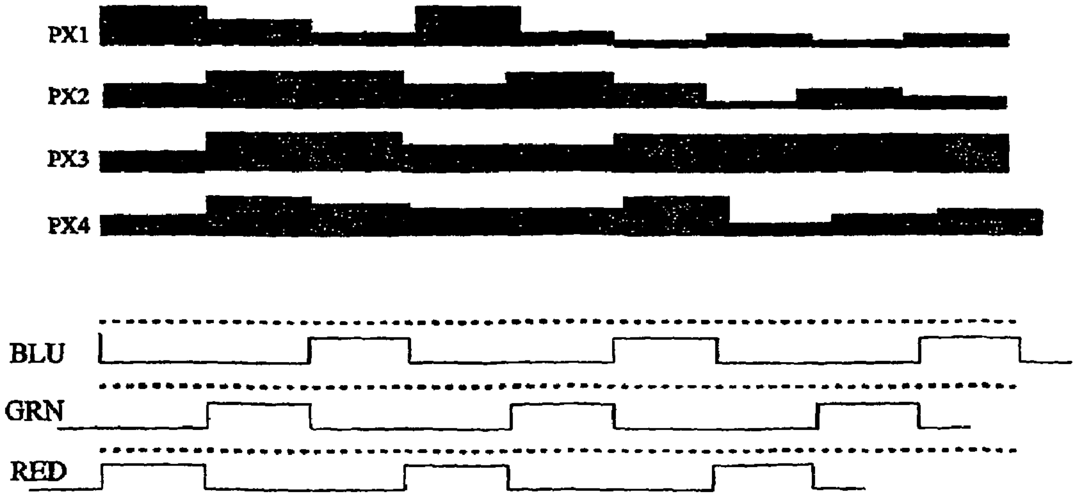
FIG. 8B illustrates a timing diagram depicting the signal pulse widths for four pixels and the colors blue, green and red in a field sequential color display system using either the method of FIG. 9 or FIG. 10 in accordance with an embodiment of the present invention.

In amplitude-modulated field sequential color display systems, the primary color lamps cycle may be at 100% intensity for each sub-cycle in field sequential color display systems, such as display system 100 (see FIG. 1), as illustrated in FIG. 8A. The present invention enhances efficiency in field sequential color display systems using amplitude modulation, as illustrated in FIG. 8B. FIG. 8A illustrates a timing diagram depicting the signal pulse widths for four pixels and the colors blue, green and red in field sequential color display system 100 (see FIG. 1) using amplitude modulation. FIG. 8B illustrates a timing diagram depicting the signal pulse widths for four pixels and the colors blue, green and red in field sequential color display system 100 (see FIG. 1) using either the method of FIG. 9 or FIG. 10 in accordance with an embodiment of the present invention. FIG. 98 is a flowchart of a method for generating colors efficiently using amplitude modulation in accordance with an embodiment of the present invention. FIG. 10 is a flowchart of another method for generating colors efficiently using amplitude modulation in accordance with an embodiment of the present invention.

Figure 9:
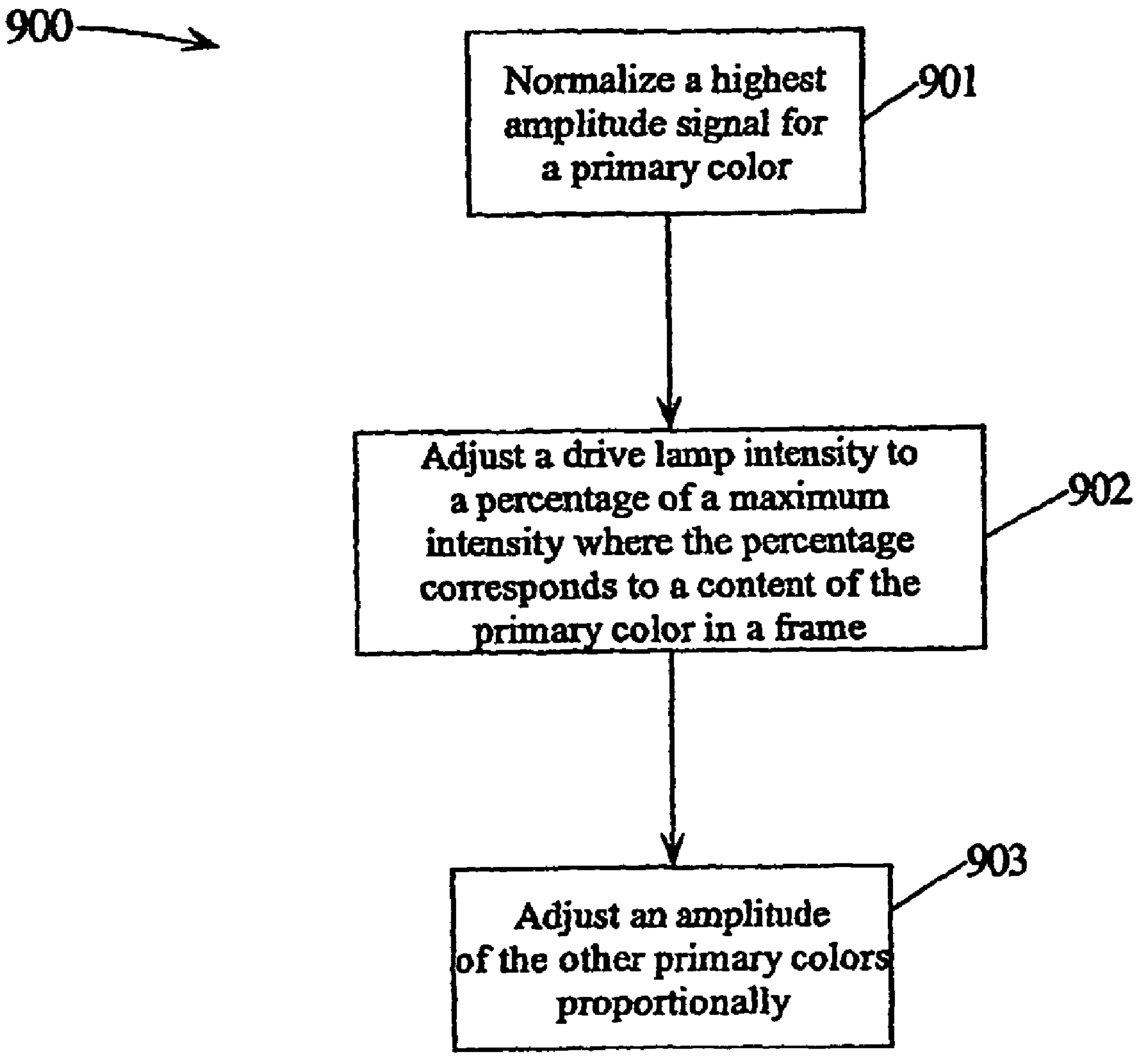
FIG. 9 is a flowchart of a method for generating colors efficiently using amplitude modulation in accordance with an embodiment of the present invention.
Figure 10:
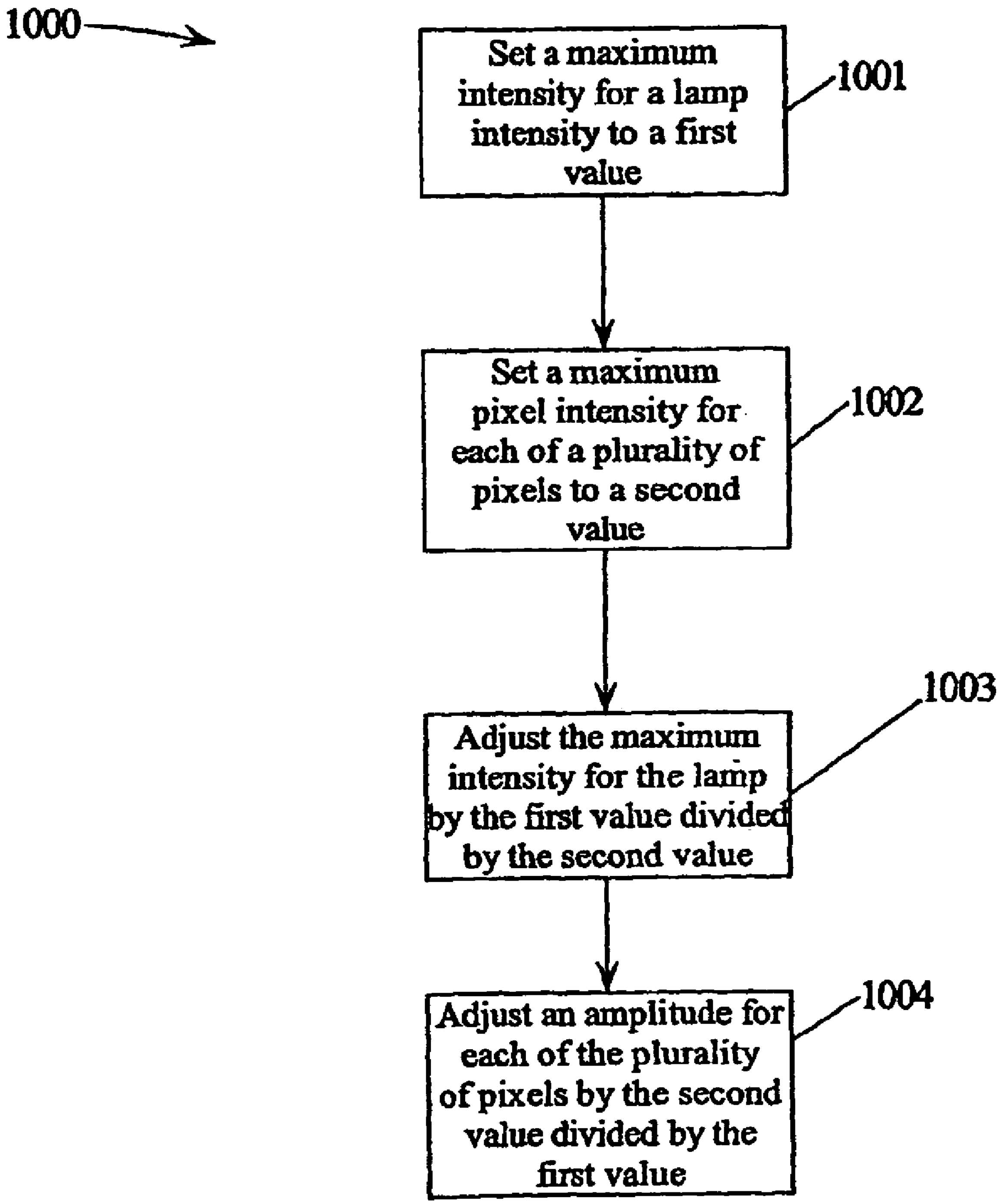
FIG. 10 is a flowchart of another method for generating colors efficiently using amplitude modulation in accordance with an embodiment of the present invention.

Referring to FIG. 9, in conjunction with FIG. 8B, in step 901, the highest amplitude signal for a given primary color subcycle during a given frame of video information is normalized. In step 902, a drive lamp intensity is adjusted to a percentage of a maximum intensity where the percentage corresponds to a content of the primary color (whose amplitude signal was normalized) in a frame. In step 903, an amplitude of all but the primary color whose amplitude signal was normalized is adjusted proportionally. It is noted that method 900 may include other and/or additional steps that, for clarity, are not depicted. It is noted that method 900 may be executed in a different order presented and that the order presented in the discussion of FIG. 9 is illustrative. It is further noted that certain steps in method 900 may be executed in a substantially simultaneous manner.

An example of implementing method 900 is as follows. If a given video frame has a maximum red content of 77%, then the drive lamp intensity is adjusted to 77% and the amplitude for that pixel is adjusted to 100%. All other pixels are adjusted proportionally as to their digitally-determined intensity value so that their visual output is identical to the default case. This calculation may be conducted continually, adjusting the drive lamps and pixel amplitudes to arrive at the lowest possible energy consumption for every instant of display output. This system lends itself to drive lamps that may not be adversely affected by continuous adjustment of input power. By logical extension, this approach may work equally well if a white lamp, e.g., a backlight, is being color filtered in a field sequential color system. For example, the RGB lamp intensities of FIG. 8B may directly map to the white drive lamp, the light from which then passes through color filters (whether stationary or moving such as in a rotating color wheel interposed between the source and the display) prior to being amplitude modulated at the pixel level.

Consulting FIG. 8B, which depicts the amplitude modulated efficiency algorithm being applied to a representative sample program (represented by four pixel data lines), it may be appreciated how much energy is saved at the drive lamps by noting the gap between the dotted line (representing 100% drive lamp intensity) with the actual drive signals for the lamps.

Real time adjustment of pixel amplitudes and lamp intensities is described below in conjunction of FIG. 10. FIG. 10 is a flowchart of another method 1000 for generating colors efficiently on a field sequential color display. Referring to FIG. 10, in step 1001, a maximum intensity for a lamp intensity is set to a first value. In step 1002, a maximum pixel intensity for each of a plurality of pixels is set to a second value. In step 1003, the maximum intensity for the lamp intensity is adjusted by the first value divided by the second value. In step 1004, an amplitude for each of the plurality of pixels is adjusted by the second value divided by the first value. It is noted that method 1000 may include other and/or additional steps that, for clarity, are not depicted. It is noted that method 1000 may be executed in a different order presented and that the order presented in the discussion of FIG. 10 is illustrative. It is further noted that certain steps in method 1000 may be executed in a substantially simultaneous manner.

An example of implementing method 1000 is as follows. The process may be initialized by setting the maximum intensity to a fixed value I, e.g., I=256 relative units. For each subcycle, the maximum pixel intensity may be set to m, e.g., m=79 relative units. The lamp intensity for the subcycle may then be set to m/I, e.g., 79/256=30.86% of full intensity, and each pixel's individual amplitude x shall be adjusted to its new value, X, using the relationship X=I x/m. For example, the fill intensity pixel originally at 79 units may be divided by 79 and multiplied by 256, which normalizes it to 256 units, as expected. A pixel at a different initial value, e.g., 61, may be adjusted by dividing 61 by 79 and multiplying by 256, yielding a corrected amplitude of 197 relative units. In all cases, the actual output intensity at each pixel may be identical to the original default values (excepting very slight shifts due to digital round-off error in applying the algorithm). Interestingly, this approach allows for extending the color palette as aggregate color intensities on-screen depart from full intensity, i.e., the darker hues of program content. This expansion of palette size (increase in amplitude divisions against the standard division value) may numerically be equivalent to I/m times the default palette size. In the example above, where 79 is the maximum pixel intensity during the pertinent subcycle, the palette was increased by I/m=324%. The image encoding software may be responsible for imprinting the additional shading definitions into the data stream being fed to the pixels. As with the efficiency enhancing algorithms, the palette enhancement may be continuously variable in real time as a function of program content.

In addition to enhancing the energy efficiency of displays, all the foregoing embodiments, incorporating the principles of the present invention outline above, coincidentally enhance the signal-to-noise ratio of display systems thereby also improving a display's contrast ratio. The signal-to-noise ratio may be enhanced because the noise floor is attenuated when unused light in a field sequential color cycle is no longer available to generate system noise via intrinsic scattering, etc.

Although the method and system are described in connection with several embodiments, it is not intended to be limited to the specific forms set forth herein; but on the contrary, it is intended to cover such alternatives, modifications and equivalents, as can be reasonably included within the spirit and scope of the invention.

The invention claimed is:

1. A method for generating colors efficiently in a field sequential color display system comprising the steps of:

waiting for a start signal for a primary color subcycle;

receiving said start signal;

activating a primary light source used to drive said primary color during said primary color subcycle if there is data in said primary color's buffer;

continuing to activate said primary light source during said primary color subcycle until there is no data in said primary color's buffer; and deactivating said primary light source during said primary color subcycle if there is no data in said primary color's buffer.

2. The method as recited in claim 1, wherein a triggering event for said activation of said primary light source is trailing edge.

3. The method as recited in claim 1, wherein a triggering event for said activation of said primary light source is leading edge.

4. The method as recited in claim 1, wherein the continuing step further comprises performing a continuous activation of said primary light source from the time that the primary light source is activated in the activating step until it is deactivated in the deactivating step.

5. A method for generating colors efficiently in a field sequential color display system comprising the steps of:

waiting for a start signal for a primary color subcycle;

receiving said start signal;

delaying an activation of a primary light source used to drive said primary color during said primary color subcycle until there is data in said primary color's buffer;

activating said primary light source during said primary color subcycle if there is data in said primary color's buffer; p1 continuing to activate said primary light source during said primary color subcycle until there is no data in said primary color's buffer; and deactivating said primary light source during said primary color subcycle if there is no data in said primary color's buffer.

6. The method as recited in claim 5, wherein the continuing step further comprises performing a continuous activation of said primary light source from the time that the primary light source is activated in the activating step until it is deactivated in the deactivating step.

7. A method for generating colors efficiently in a field sequential color display system comprising the steps of:

waiting or a first start signal for a first primary color subcycle:

receiving said first start signal;

activating a first primary light source used to drive said first primary color during said first primary color subcycle if there is data in said first primary color's buffer;

continuing to activate said first primary light source during said first primary color subcycle until there is no data in said first primary color's buffer;

deactivating said first primary light source during said first primary color subcycle if there is no data in said first primary color's buffer.

waiting for a second start signal for a second primary color subcycle;

receiving said second start signal;

activating a second primary light source used to drive said second primary color during said second primary color subcycle if there is data in said second primary color's buffer;

continuing to activate said primary light source during said second primary color subcycle until there is no data in said second primary color's buffer; and deactivating said second primary light source during said second primary color subcycle if there is no data in said second primary color's buffer.

* * * * *